United States Patent
Choi et al.

(10) Patent No.: US 8,529,715 B2
(45) Date of Patent: Sep. 10, 2013

(54) APPARATUS FOR ATTACHING SUBSTRATES AND GAP CONTROL UNIT THEREOF

(71) Applicants: Bong Hwan Choi, Seoul (KR); Seok Hee Shim, Seongnam-si (KR)

(72) Inventors: Bong Hwan Choi, Seoul (KR); Seok Hee Shim, Seongnam-si (KR)

(73) Assignee: ADP Engineering Co., Ltd., Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 13/784,159

(22) Filed: Mar. 4, 2013

(65) Prior Publication Data

US 2013/0181407 A1    Jul. 18, 2013

Related U.S. Application Data

(62) Division of application No. 11/867,958, filed on Oct. 5, 2007, now Pat. No. 8,388,781.

(30) Foreign Application Priority Data

Dec. 6, 2006 (KR) .......................... 10-2006-0123232
Dec. 8, 2006 (KR) .......................... 10-2006-0125010

(51) Int. Cl.
 *B32B 41/00* (2006.01)
(52) U.S. Cl.
 USPC ............ 156/64; 156/350; 156/362; 156/363; 156/364; 156/378; 156/381; 445/24; 445/25; 445/60
(58) Field of Classification Search
 USPC ................... 156/64, 350, 362, 363, 364, 378, 156/381; 445/24, 25, 60
 See application file for complete search history.

(56) References Cited

U.S. PATENT DOCUMENTS 2,650,865 A     9/1953 Claude
2004/0095546 A1  5/2004 Lee et al.

FOREIGN PATENT DOCUMENTS

| JP | 2000284295 A | 10/2000 |
| KR | 10-2004-0043205 | 5/2004 |
| TW | I253891 | 4/2006 |

OTHER PUBLICATIONS

U.S. Office Action issued in U.S. Appl. No. 11/867,958 dated Jul. 9, 2010.
U.S. Office Action issued in U.S. Appl. No. 11/867,958 dated Sep. 30, 2010.
U.S. Final Office Action issued in U.S. Appl. No. 11/867,958 dated Mar. 2, 2011.
Taiwanese Office Action issued in TW Appln No. 096137915 dated Mar. 11, 2011.
U.S. Notice of Allowance issued in U.S. Appl. No. 11/867,958 dated Nov. 15, 2012.
Korean Office Action issued in KR Appln No. 10-2006-0123232 dated Oct. 30, 2012.

*Primary Examiner* — Katarzyna Wyrozebski Lee
*Assistant Examiner* — Joshel Rivera
(74) *Attorney, Agent, or Firm* — KED & Associates LLP

(57) ABSTRACT

An apparatus for attaching substrates includes a first chamber for supporting a first substrate and a second chamber for supporting a second substrate. A main seal member is placed between the first chamber and the second chamber so as to maintain a seal and a gap between the chambers. An alignment control part is placed between the first chamber and the second chamber so as to maintain the seal, and also to allow the second chamber to move with respect to the first chamber in order to align the substrates. The alignment control part may also control a gap between the chambers, to thereby maintain a uniform gap between the substrates.

4 Claims, 16 Drawing Sheets

APPARATUS FOR ATTACHING SUBSTRATES AND GAP CONTROL UNIT THEREOF

This application is a divisional of U.S. patent application Ser. No. 11/867,958, filed Oct. 5, 2007, which claims priority under 35 U.S.C. §119 to Korean Patent Applications Nos. 10-2006-0123232 & 10-2006-0125010, filed in Korea on Dec. 6, 2006 and Dec. 8, 2006, respectively, the entire contents of which are incorporated herein by reference.

BACKGROUND

1. Field

The present disclosure relates to an apparatus for attaching substrates and a gap control unit thereof.

2. Background

An apparatus for attaching substrates is used to attach two substrates of a flat panel display device to each other. The thin panel display device could be thin film transistor liquid crystal display (MT-LCD) panel, a plasma display panel (PDP), an OLED or some other type of display device.

A TFT-LCD device typically includes, a TFT substrate on which a plurality of TFTs (thin film transistors) are formed in a matrix, and a color filter substrate on which a color filter or a light shielding film is formed. The two substrates oppose each other and are attached to each other with a gap of a few micrometers.

The substrate attachment is performed by first aligning the substrates with respect to each other, attaching them to each other, and then pressing the two substrates together using pressure. An apparatus for attaching substrates typically includes a first chamber and a second chamber spaced apart from the first chamber. An inside surface of each chamber is provided with an electrostatic chuck (ESC) for holding the substrates before the attachment. The upper chamber may also include a vacuum chuck as well.

During the attachment process, the two substrates are carried into the apparatus and they are mounted on the upper and lower chambers. The first and the second chambers come together to form a sealed attaching space. The sealed attaching space is then vacuum exhausted by a pump so as to form a vacuum state in the inside thereof. A sealing member is provided between the first and the second chambers to maintain the vacuum in the sealed attaching space. The substrates are then aligned with each other, and the two substrates are attached to each other.

The attachment of the two substrates is performed only after the two substrates have been brought closely adjacent to each other. The substrates must be brought into close proximity to precisely align them, which is very important to the quality of the resulting display device.

When the substrates are brought close to each other, the above mentioned seal member is used to maintain the vacuum in the sealed attaching space. The sealing member also helps to control the gap between the substrates when they are in close proximity to each other, and before the attachment. The gap between the substrates can be determined by a depression amount of the seal member.

Another important factor in the apparatus for attaching substrates is the ability to perform horizontal movements of one or both chambers to properly align the substrates. In a conventional apparatus for attaching substrates, the gap maintenance and the horizontal movement are performed separately while maintaining the vacuum state. However, when these processes are performed sequentially, it takes a long time to accomplish the entire process.

BRIEF DESCRIPTION OF THE DRAWINGS

The embodiments will be described in detail with reference to the following drawings, in which like reference numerals refer to like elements, and wherein.

DETAILED DESCRIPTION

Multiple embodiments will be described in greater detail with reference to the accompanying drawings. Whenever possible, the same reference symbols will be used to designate elements having the same functions.

Figure 1:
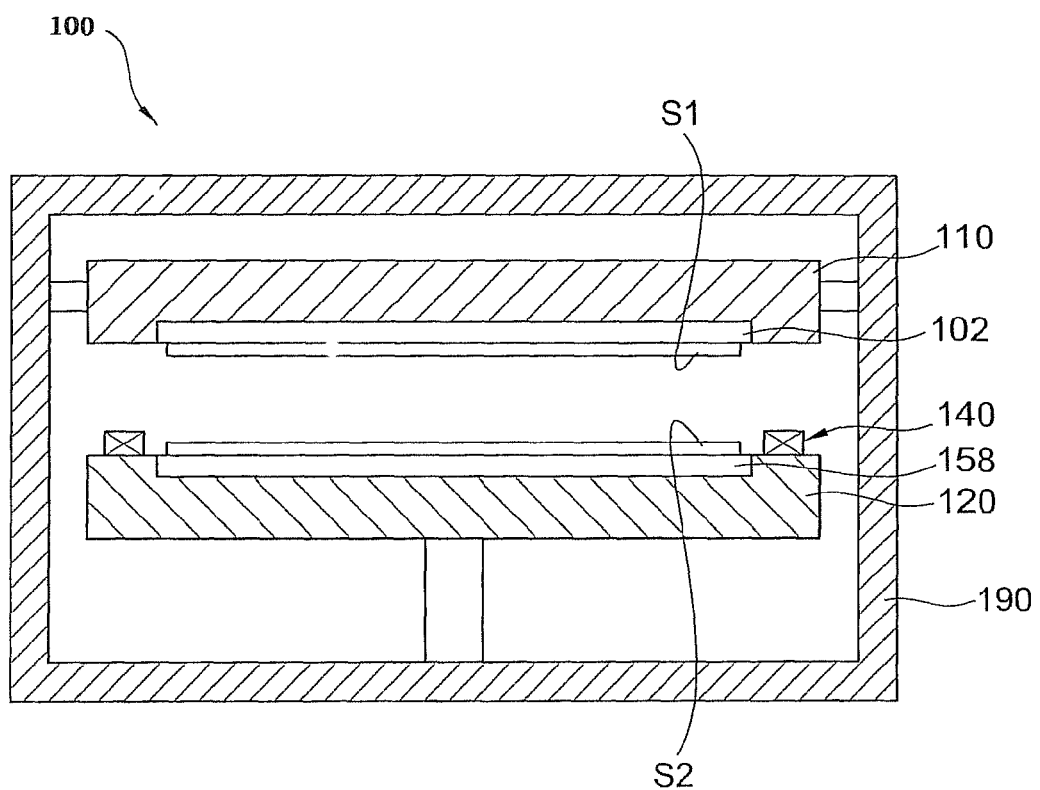
FIG. 1 is a side sectional view illustrating a first embodiment of an apparatus for attaching substrates.

FIG. 1 illustrates an apparatus 100 for attaching substrates. As shown in FIG. 1, the apparatus 100 for attaching substrates is provided with a supporting frame 190 which forms an external appearance of the apparatus. A first chamber 110 is located at an inside upper part of the supporting frame 190. A second chamber 120 is located below the first chamber 110. The first chamber 110 and the second chamber 120 can be brought together to form a sealed attachment space therebetween. The substrates S1 and S2 may be the upper and lower substrates of any display device, such as a TFT substrate or a color filter substrate of an LCD display.

The first chamber 110 supports the first substrate S1 and the second chamber 120 supports the second substrate S2. To this end, inside surfaces of the first chamber 110 and the second chamber 120 are respectively provided with a first chuck 102 and a second chuck 158. The first chuck 102 and the second chuck 158 may be electrostatic chucks (ESCs), vacuum chucks, combinations of the ESC and vacuum chucks, and any other type of chuck capable of securely holding the substrates on the upper and lower chambers.

An ESC chuck holds the substrates S1 and S2 by an electrostatic force produced by application of DC power. This ESC may be one in which a film is attached onto an aluminum body. Various types of films may be used, such as a type in which a polyimide electrode is inserted.

Also, though not shown, the first chamber 110 and the second chamber 120 may be provided with a plurality of stages for aligning the substrates S1 and S2. The stages would be used to move one or both of the substrates in X, Y and possibly in a rotational fashion to properly align the substrates. One or more cameras or imaging devices may also be used to detect alignment marks for purposes of alignment of the substrates.

A driving part can be used to move one or both of the chambers to bring them together. Also, one or more vacuum pumps may be used to generate a vacuum in the sealed attachment space.

An alignment control part 140 extends around a periphery of the first and second chambers. The alignment control part permits a sliding movement of the second chamber 120 with respect to the first chamber 110. The alignment control part 140 is provided between the first chamber 110 and the second chamber 120 so as to maintain a seal of the attachment space. The alignment control part is also used to control a gap between the chambers, and thus the gap between the substrates. The alignment control part allows the substrates to move with respect to each other, to accomplish alignment, while still maintaining the seal and the gap.

Figure 3:
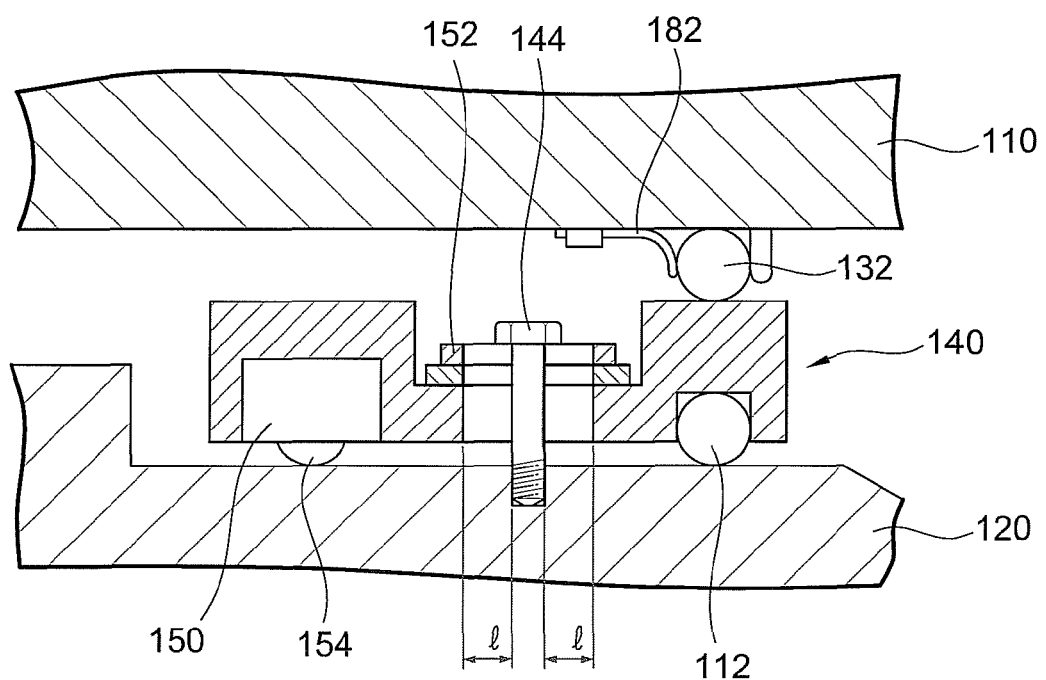
FIGS. 3 and 4 illustrate an operation of the alignment control part.
Figure 4:
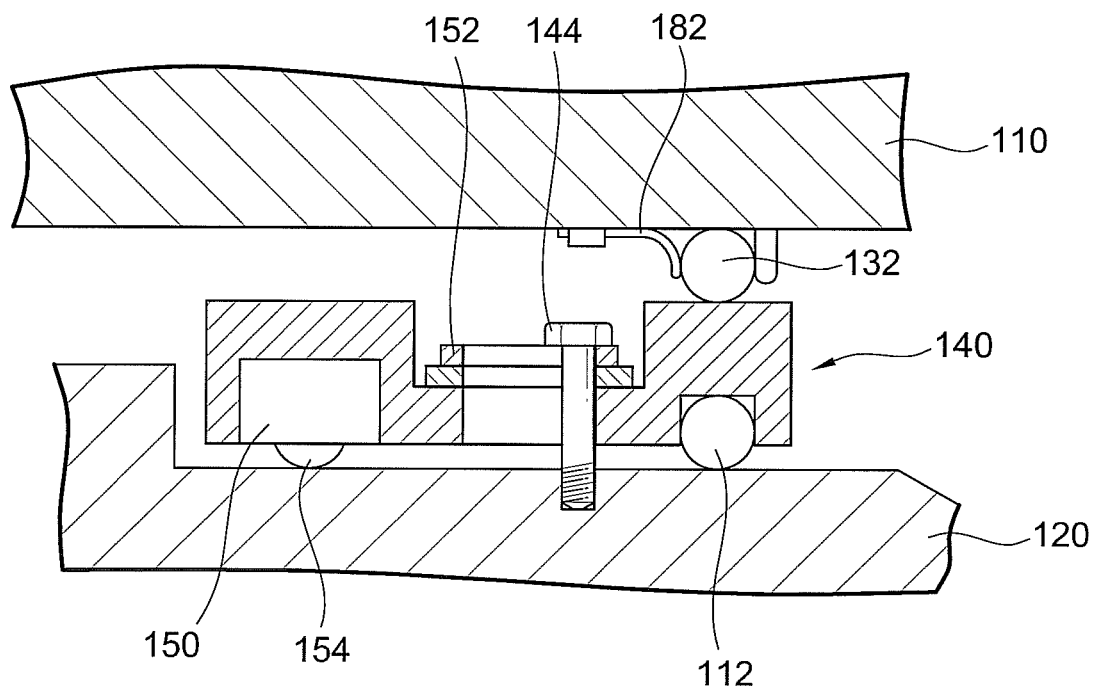

As shown in FIGS. 3 and 4, a main seal member 132 maintains a seal and a gap between the substrates 51 and S2. The main seal member 132 is fixed to the first chamber 110, and serves to control the gap between the substrates S1 and S2. The main seal member 132 is fixed by a fixing plate 182.

Figure 2:
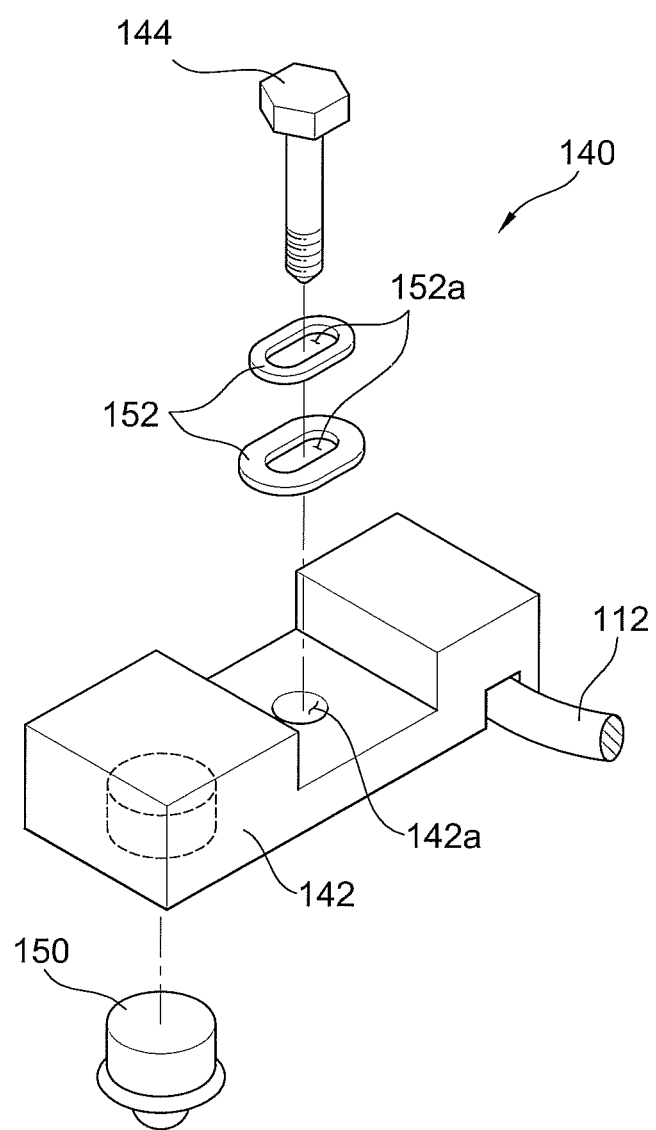
FIG. 2 is an exploded perspective view illustrating an alignment control part of an apparatus for attaching substrates.

As shown in FIG. 2, the alignment control part 140 includes an auxiliary seal member 112 which is in close contact with the second chamber 120, and which maintains the sealed state regardless of the movement of the second chamber 120. A main body 142 receives the auxiliary seal member 112, and a bolt 144 fixes the main body 142 to the second chamber 120 while maintaining a predetermined gap. The main body 142 is also provided with a ball flange 150 which is in contact with the second chamber 120.

An installing hole 142a has a larger diameter than the bolt 144 so as to allow the bolt 144 to be inserted therein and to move therein. One or more washers 152 formed with an elongated hole 152a are provided between the installing hole 142a and the bolt 144 so that the bolt 144 is supported on the main body 142. The washers 152 formed with the elongated hole 152a and the installing hole 142a having a diameter larger than the bolt 144 allow the second chamber 120 to move horizontally relative to the first chamber 110, while maintaining the vacuum in the sealed attachment space, and the gap.

The movements of the alignment control part 140 and the second chamber 120 are illustrated in FIGS. 3 and 4. FIGS. 3 and 4 illustrate the interface between the first and second chambers after the substrates S1 and S2 have been mounted on the first and second chambers, and after the first and second chambers have been brought together to form the sealed attachment space. A check is then performed to determine whether a depression of the main seal member 132 is uniform. Maintenance of a uniform depression of the main seal member 132 means that the gap between the substrates S1 and S2 is maintained uniformly. The vacuum-exhaustion of the sealed attachment space can then be performed.

After confirming that the main seal member 132 is pressed uniformly, alignment of the substrates is performed by moving the substrates relative to each other, and detecting the state of alignment with the above-described imaging cameras. The cameras detect images of alignment marks on the substrates. The substrates are moved relative to each other until the alignment marks are brought into registration.

If the alignment marks of the substrates S1 and S2 are not in registration, a process of horizontally moving the second chamber 120 relative to the first chamber 110 is performed. As the second chamber 120 is moved, the bolt 144 fixed to the second chamber 120 is allowed to move within gaps l between the bolt and the sidewalls of the installing hole 142a. Because the bolt 144 can move within the gaps l and within the elongated holes 152a formed in the washers 152, the alignment control part 140 including the main body 142 can maintain the vacuum state, and the substrates can be moved relative to each other.

In the prior art, movement of the second chamber 120 to accomplish alignment had to be performed separately from the process of maintaining the seal and the gap. However, with the above-described alignment control part, both processes can be performed simultaneously, thereby shortening a process time.

The ball flange 150 provided in the main body 140 serves to set a maintenance height of the auxiliary seal member 112 so that the auxiliary seal member 112 is maintained in close contact with the second chamber 120. The ball 154 also functions to reduce friction with the second chamber 120, making movement of the second chamber easier to accomplish. In order to further reduce the friction due to the horizontal movement of the second chamber 120, grease may be applied to contact surfaces between the auxiliary seal member 112 and the second chamber 120.

Figure 5:
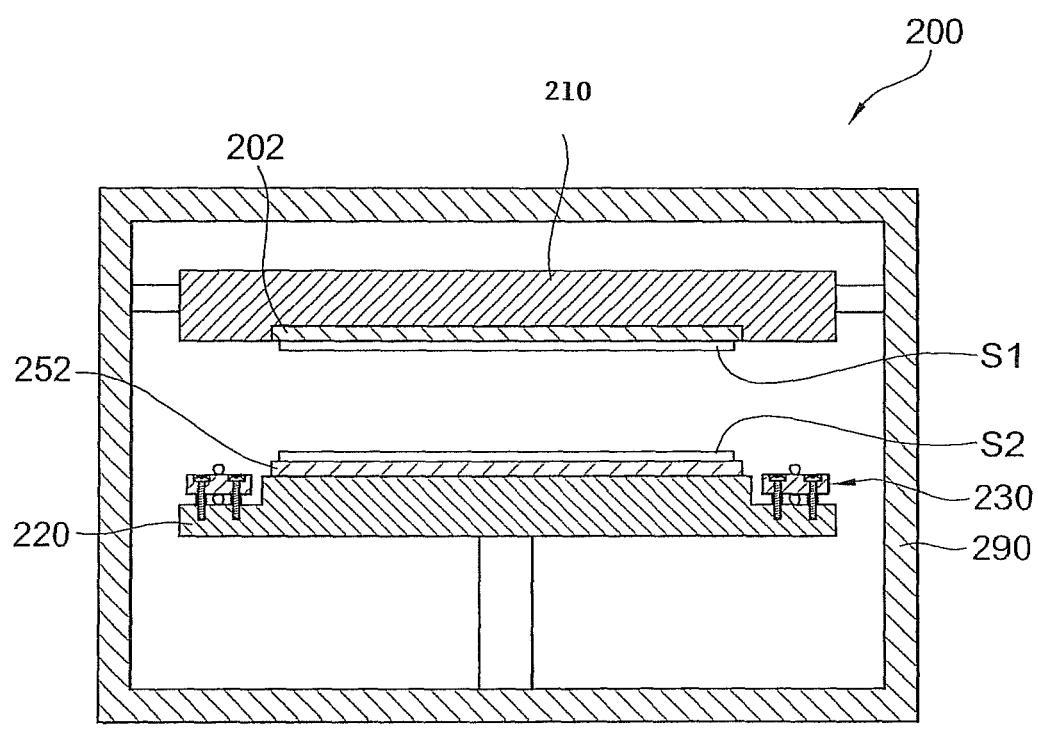
FIG. 5 is a side sectional view illustrating another embodiment of an apparatus for attaching substrates.

FIG. 5 illustrates another embodiment of an apparatus for attaching substrates 200 having a gap control unit 230. As shown in the drawing, and similar to the embodiment described above, the apparatus 200 for attaching substrates is provided with a supporting frame 290 which forms an external appearance of the apparatus. A first chamber 210 is located at an inside upper part of the supporting frame 290. A second chamber 220 is located at a lower part of the first chamber 210, spaced apart from the first chamber 210. The first chamber 210 and the second chamber 220 come together to form a sealed attaching space in which a first substrate S1 and a second substrate S2 are attached.

Figure 6:
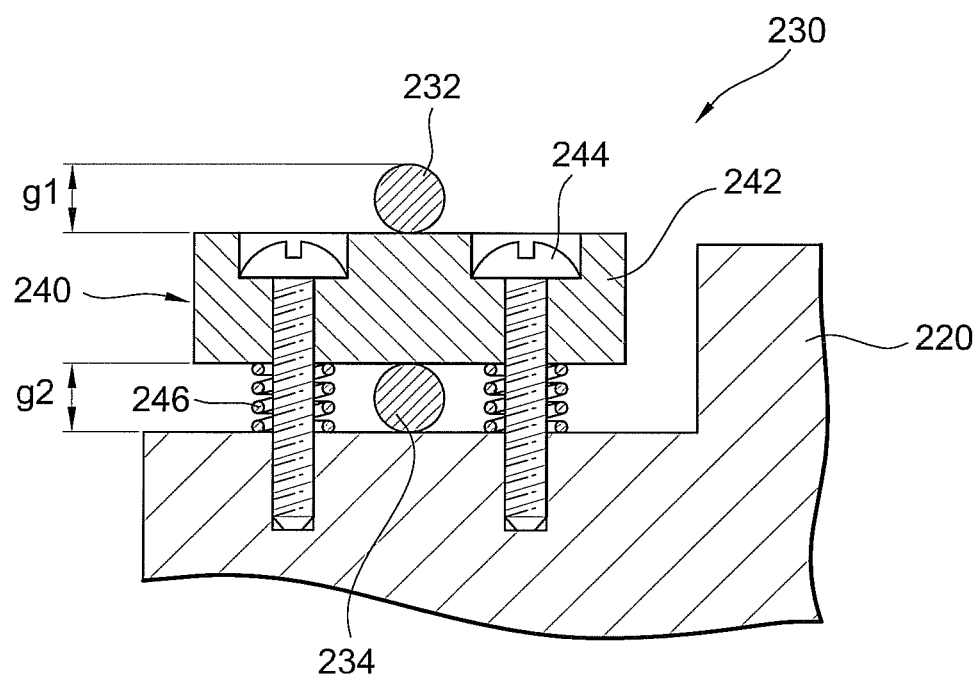
FIG. 6 is an enlarged view illustrating an alignment control part of the apparatus shown in FIG. 5.

The gap control unit 230 is located at a periphery where the first chamber 210 and the second chamber 220 come into close contact with each other. The gap control unit 230 includes, as shown in FIG. 6, a main seal member 232 which comes into close contact with the first chamber 210 to maintain a seal. A second seal member 234 maintains a seal between an upper plate 242 and the second chamber 220. A depression control part 240 is placed between the main seal member 232 and the second seal member 234 so as to control a compression of the second seal member 234.

The main seal member 232 comes into close contact with the first chamber 210 and serves to maintain a gap between the substrates. However, if the main seal member is not uniformly compressed at all points around the periphery of the first and second chambers, the gap between the substrates may be uneven. The second seal member 234 compensates for differences in the compression amount of the main seal member 232 so that a uniform gap is maintained between the two substrates.

The depression control part 240 includes, as shown, an upper plate 242 placed between the main seal member 232 and the second seal member 234. Fastening bolts 244 located on either side of the second seal member 234 ensure that the second seal member 234 is in close contact with the second chamber 220. The fastening bolts also attach the upper plate 242 to the second chamber 220. Springs 246 are provided around the fastening bolts 244 between the second chamber 220 and the upper plate 242.

The fastening bolts 244 control a gap g2 of the second seal member 234. When one portion of the main seal member 232 is depressed more than other portions by the first chamber 210, the upper plate 242 is allowed to move downward, against the force of the springs 246, and the second seal member 234 is compressed.

Figure 7:
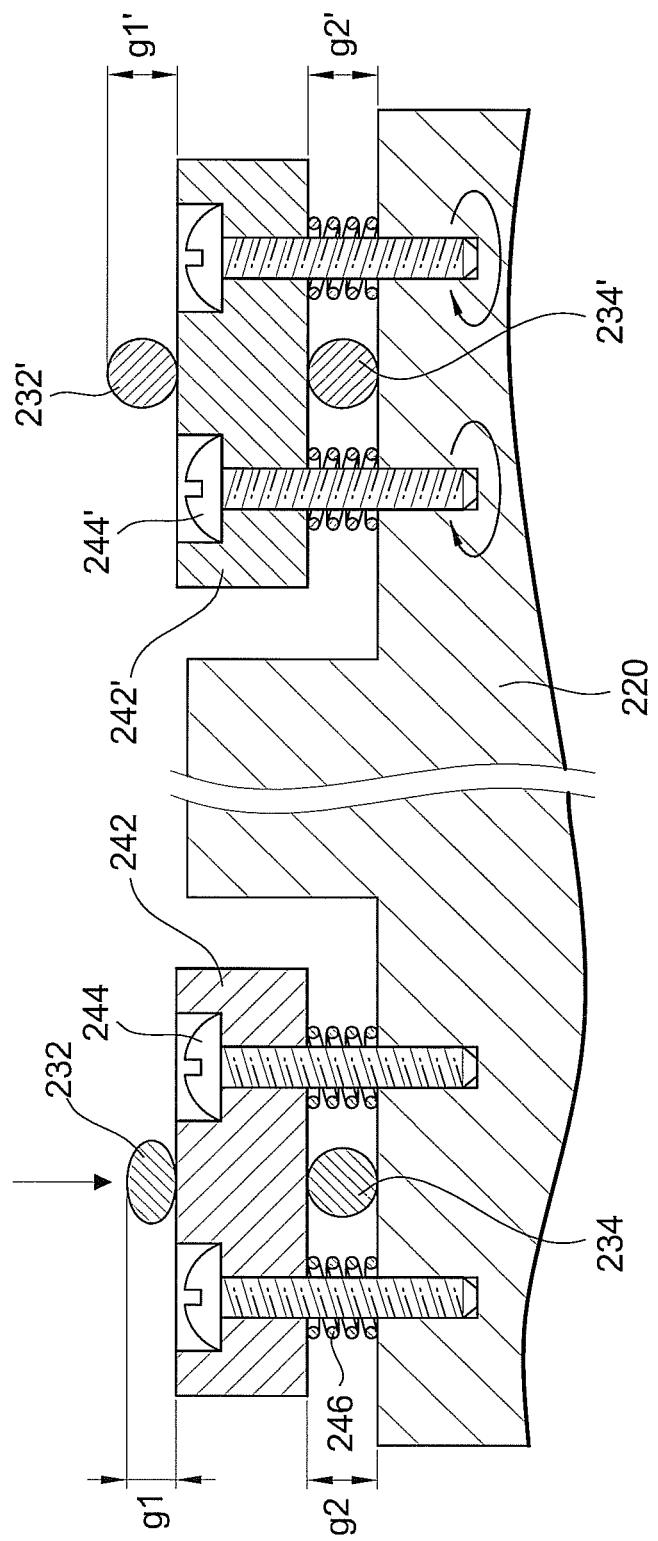
FIG. 7 illustrates an operation of the alignment control part of the apparatus shown in FIG. 5.

FIG. 7 shows a situation where the main seal member 232 is compressed more on one side of the apparatus than on the other side. Referring to the drawing, the main seal member 232 is depressed as the first chamber 210 and the second chamber 220 come into close contact with each other. It can be appreciated that, when comparing the portion of the main seal member 232 located on the left side of the apparatus to the portion of the main seal member 232' located on the right, the left main seal member 232 is depressed more than the right main seal member 232' (g1'>g1). In this case, it can be judged that the gap between the substrates S1 and S2 is also not uniform over the entire area of the substrates.

When such a problem arises, it is necessary to take steps to ensure that a uniform gap is maintained between the substrates S1 and S2. Ideally, we want to ensure that the total combined height of the main seal member 232 and the second seal member 234 located on the left and right sides are equal to one another (g1+g2=g1'+g2'). In this case, the gap problem can be solved by controlling the fastening bolts 244' to compress the right buffering seal member 234' with the upper plate 242'. In other words, the right buffering seal member 234' is compressed by pressing the right upper plate 242' so that a compression amount of the second seal member 234' equals a compression amount of the main seal member 232. As a result, the gap between the substrates becomes uniform across the entire area of the substrates.

Figure 8:
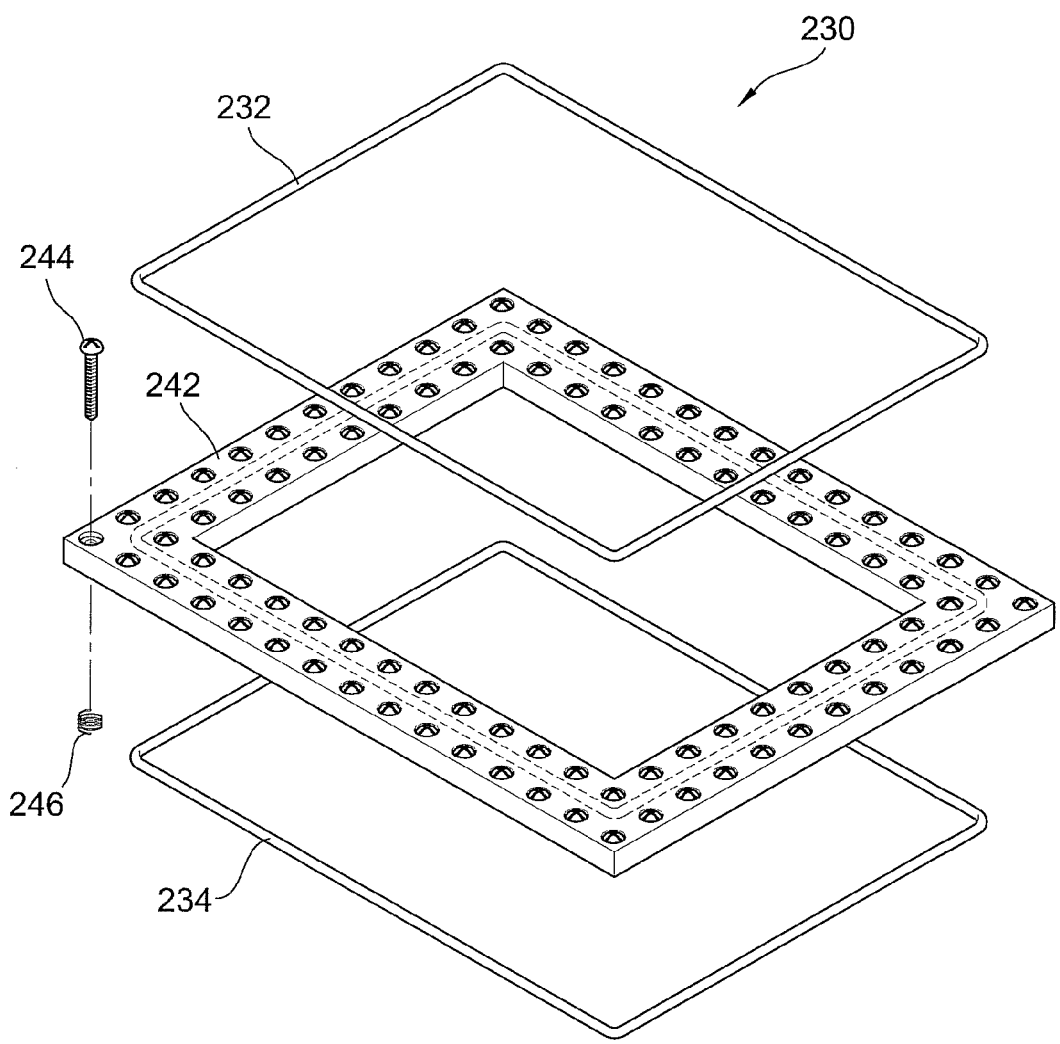
FIG. 8 is an exploded perspective view illustrating another embodiment of an alignment control part of an apparatus for attaching substrates.
Figure 9:
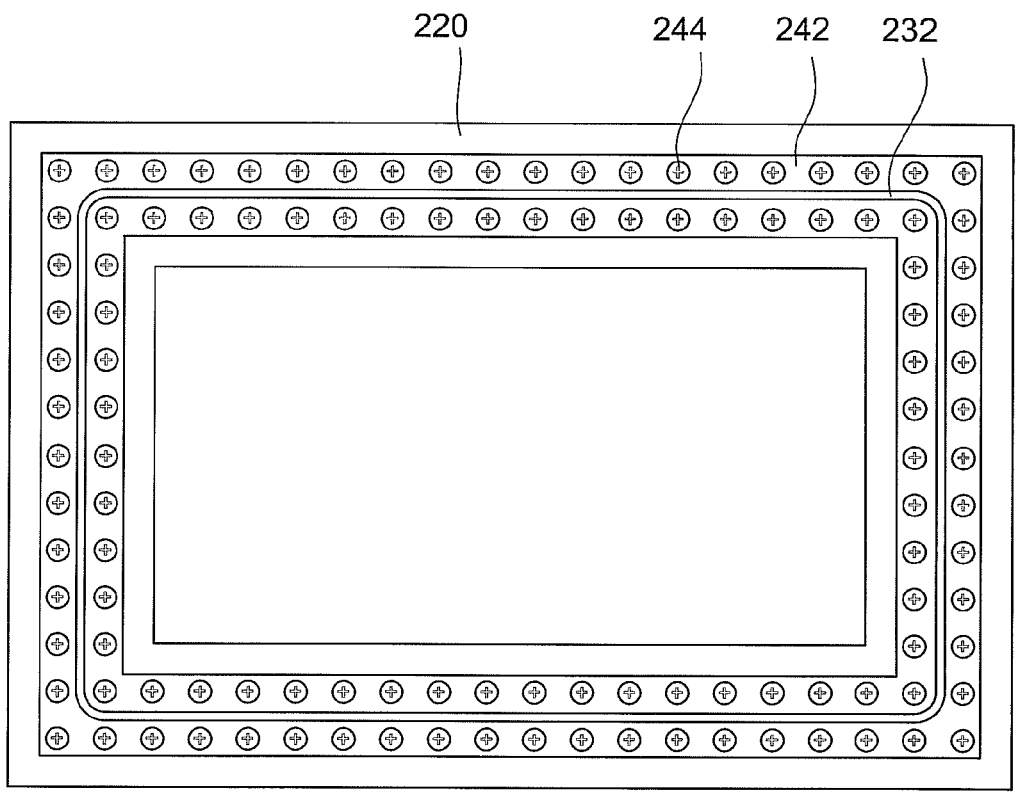
FIG. 9 is a plan view of the apparatus shown in FIG. 8.

The gap control unit described above could actually be constructed in a variety of different ways. As shown in FIG. 8, the upper plate 242 may be formed into a rectangular plate having a vertical through-hole at its center. The gap control unit 230 could then be installed in the second chamber 220 as shown in FIG. 9.

Figure 10:
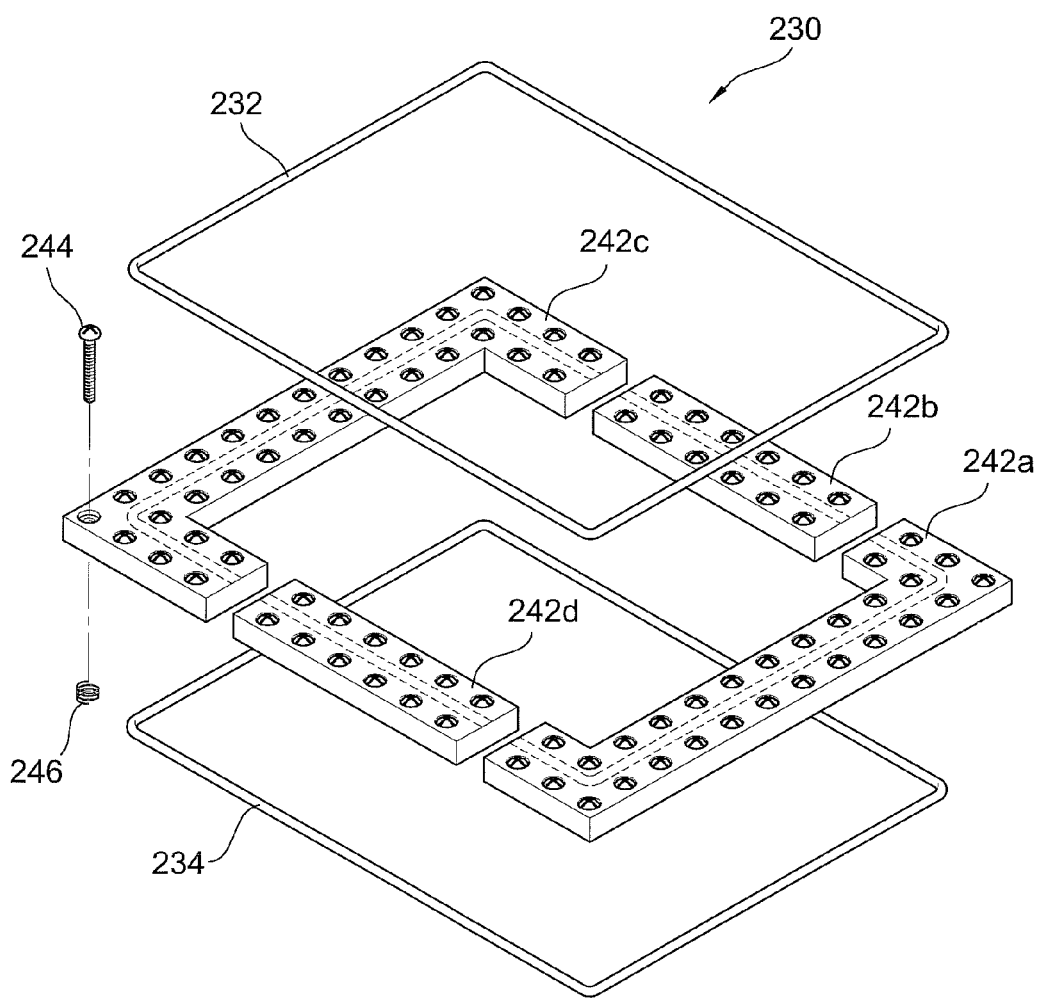
FIG. 10 is an exploded perspective view illustrating another embodiment of an alignment control part of an apparatus for attaching substrates.
Figure 11:
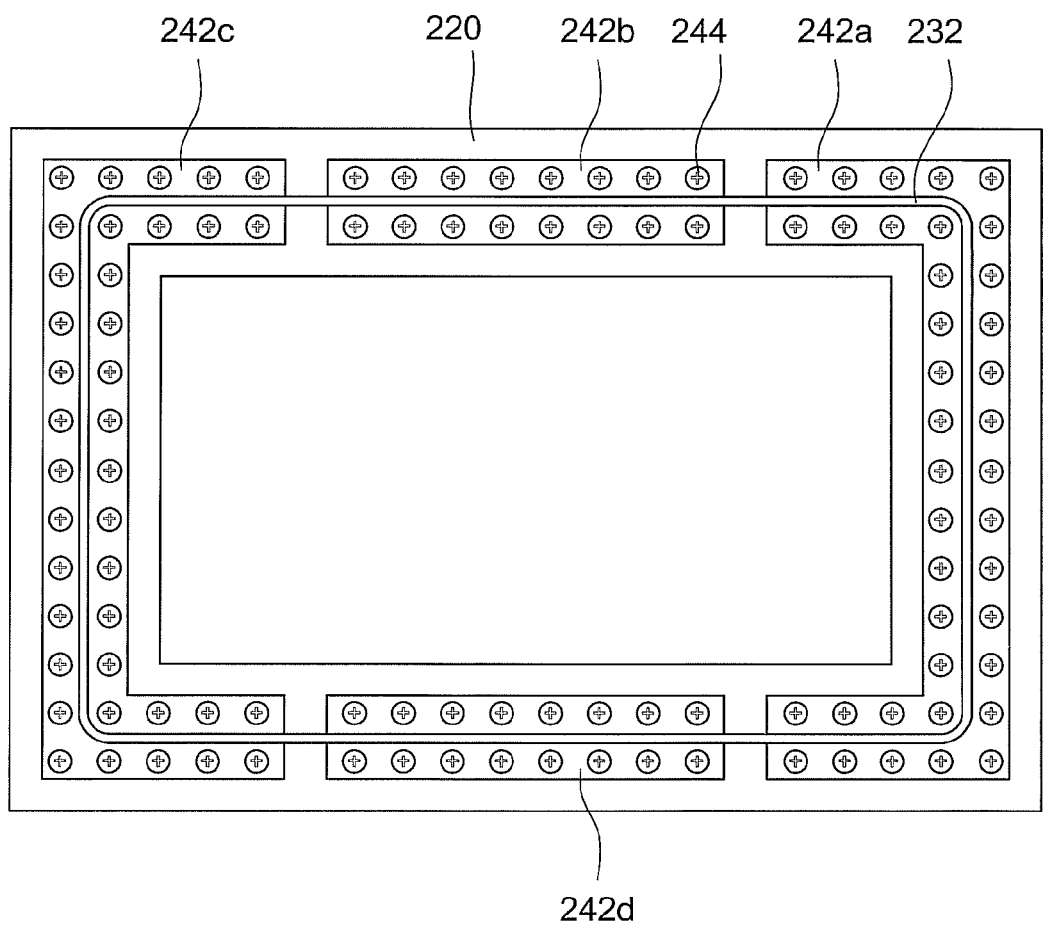
FIG. 11 is a plan view of the apparatus shown in FIG. 10.

The gap control unit also could be formed from a plurality of the upper plates segments which, when combined together, form a ring around the periphery of the second chamber 220. As shown in FIG. 10, the upper plate 242 may be formed by a plurality of panel segments 242a, 242b, 242c and 242d which are separately installed on the second chamber 220, as shown in FIG. 11. In this case, a separate seal member may be provided among the plurality of panel segments 242a, 242b, 242c and 242d which form the upper plate 242.

Figure 12:
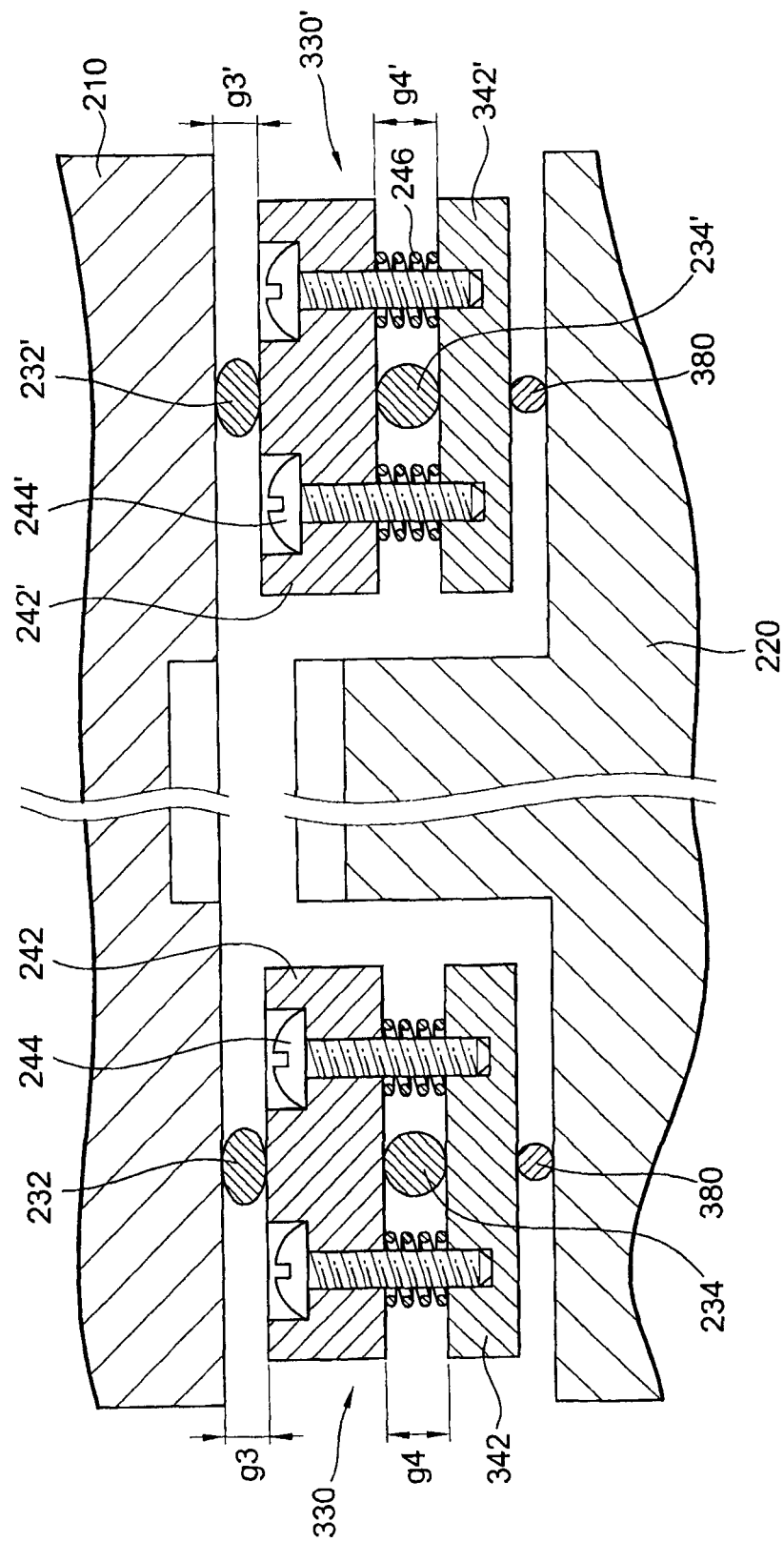
FIG. 12 is an enlarged view illustrating another embodiment of an alignment control part of an apparatus for attaching substrates.

FIG. 12 shows another embodiment of a gap control unit 330. This embodiment includes a main seal member 232 which is placed between the first chamber 210 and the second chamber 220 and which comes into close contact with the first chamber 210 to maintain a seal. A second seal member 234 is used to compensate for uneven compression of the main seal member 232. A depression control part 240 is placed between the main seal member 232 and the second seal member 234 and controls a compression amount of the second seal member 234 so as to control the gap between the substrates.

The depression control part 240 includes, as shown, an upper plate 242 placed between the main seal member 232 and the second seal member 234. A lower plate 342 is placed between the second seal member 234 and the second chamber 220. An auxiliary seal member 380 is placed between the lower plate 342 and the second chamber 220, and fastening bolts are located on either side of the second seal member 234 for coupling the upper plate 242 and the lower plate 342. Springs 246 are provided on an outer periphery of the fastening bolts 244.

If there is a difference in the amount of compression of the main seal member 232, this gap control unit 330 compresses the second seal member 234 to compensate for this difference, thereby ensuring that the gap between the substrates S1 and S2 is uniform. If a height g3 of the main seal member 232 located at one portion is different from a height g3' of the main seal member 232' located at another portion, the gap control unit 330 selectively compresses a portion of the second seal member 234 so that the combined heights of the main seal member 232 and the second seal member 234 is the same at all points. For instance, the fastening bolts 244' are used to press the second seal member 234' at a portion with the upper plate 242'.

Figure 13:
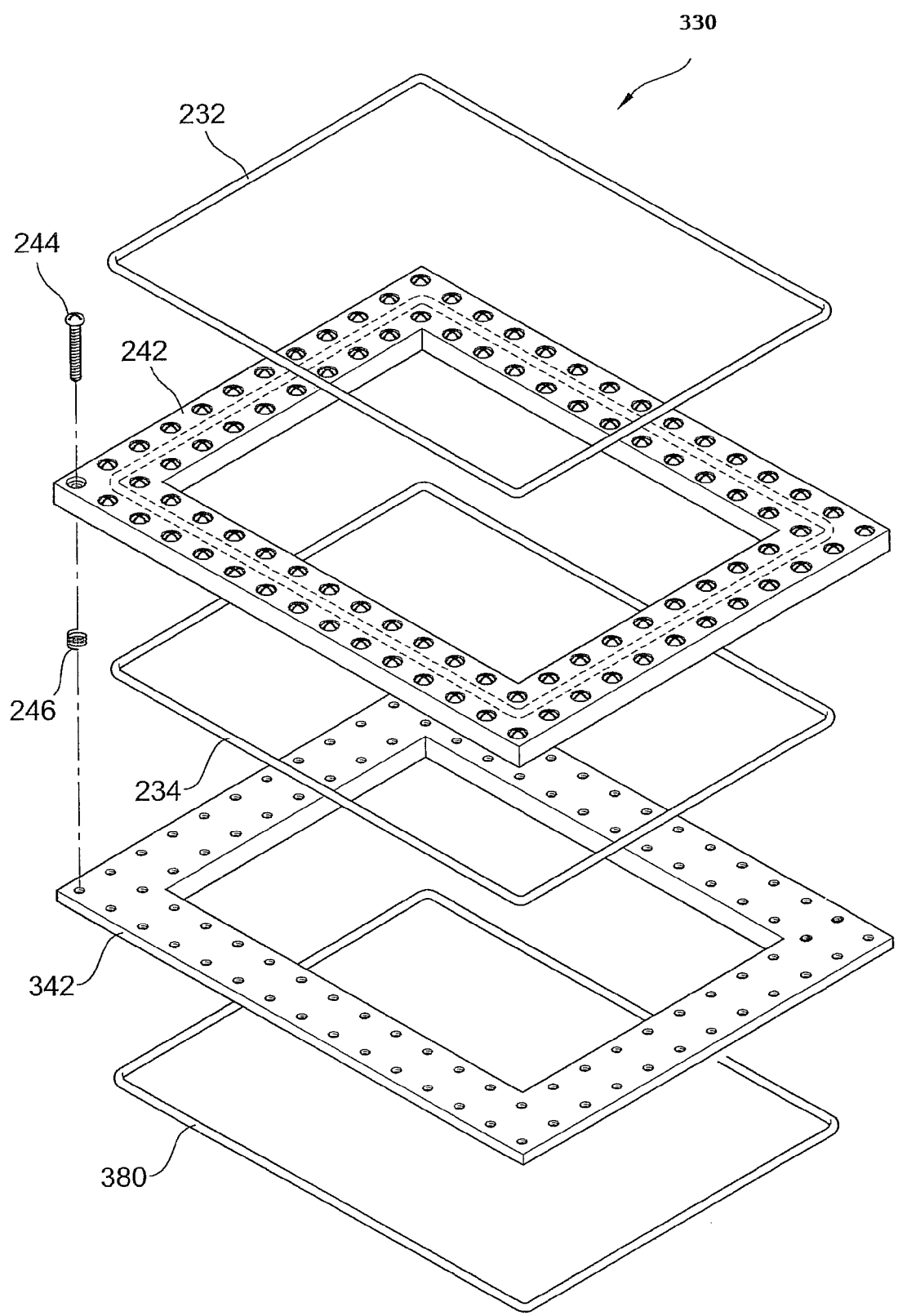
FIG. 13 is an exploded perspective view illustrating the alignment control part shown in FIG. 12.
Figure 14:
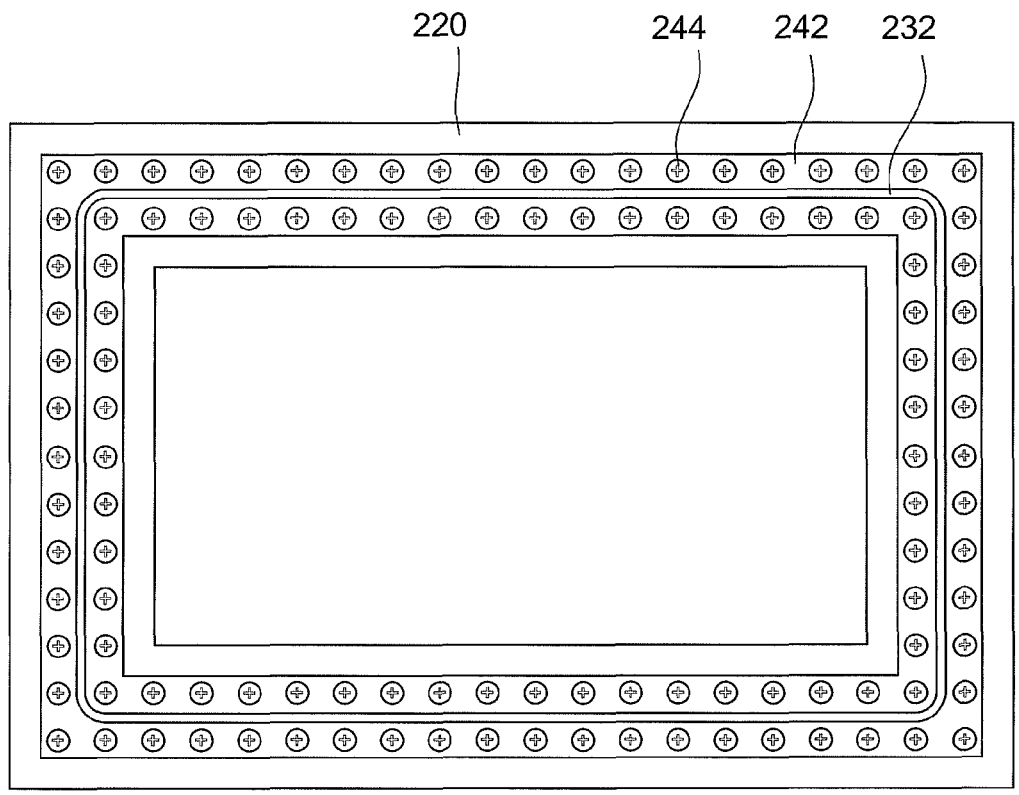
FIG. 14 is a plan view of the apparatus shown in FIG. 13.

The gap control unit 330 shown in FIG. 12 may be formed in various different ways. As shown in FIG. 13, the upper plate 242 and the lower plate 342 may be may be rectangular, with a vertical through-hole in the center. In this instance, the gap control unit 330 can be installed in the second chamber 220 as shown in FIG. 14.

Figure 15:
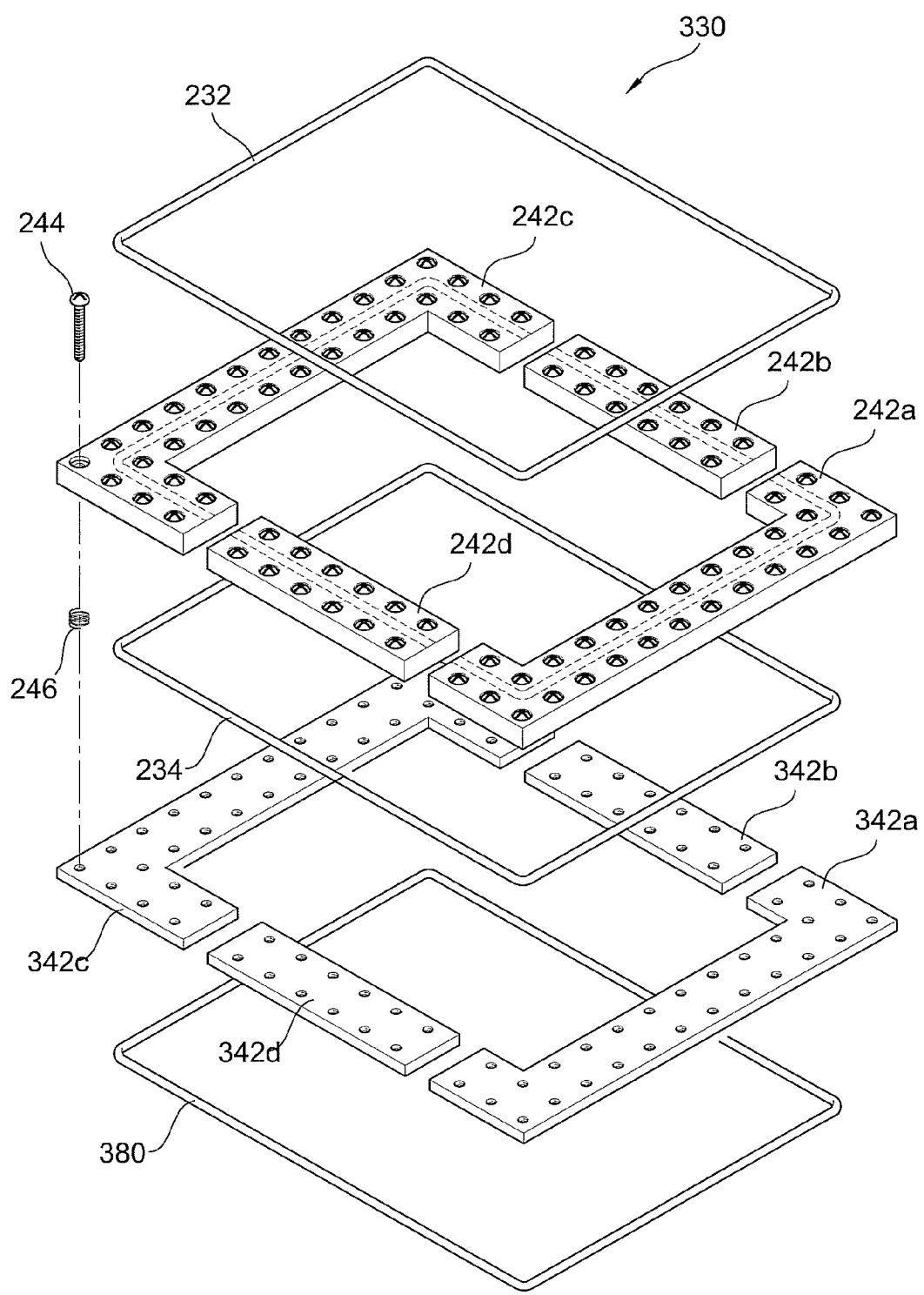
FIG. 15 is an exploded perspective view illustrating a further embodiment of the alignment control part of an apparatus for attaching substrates.
Figure 16:
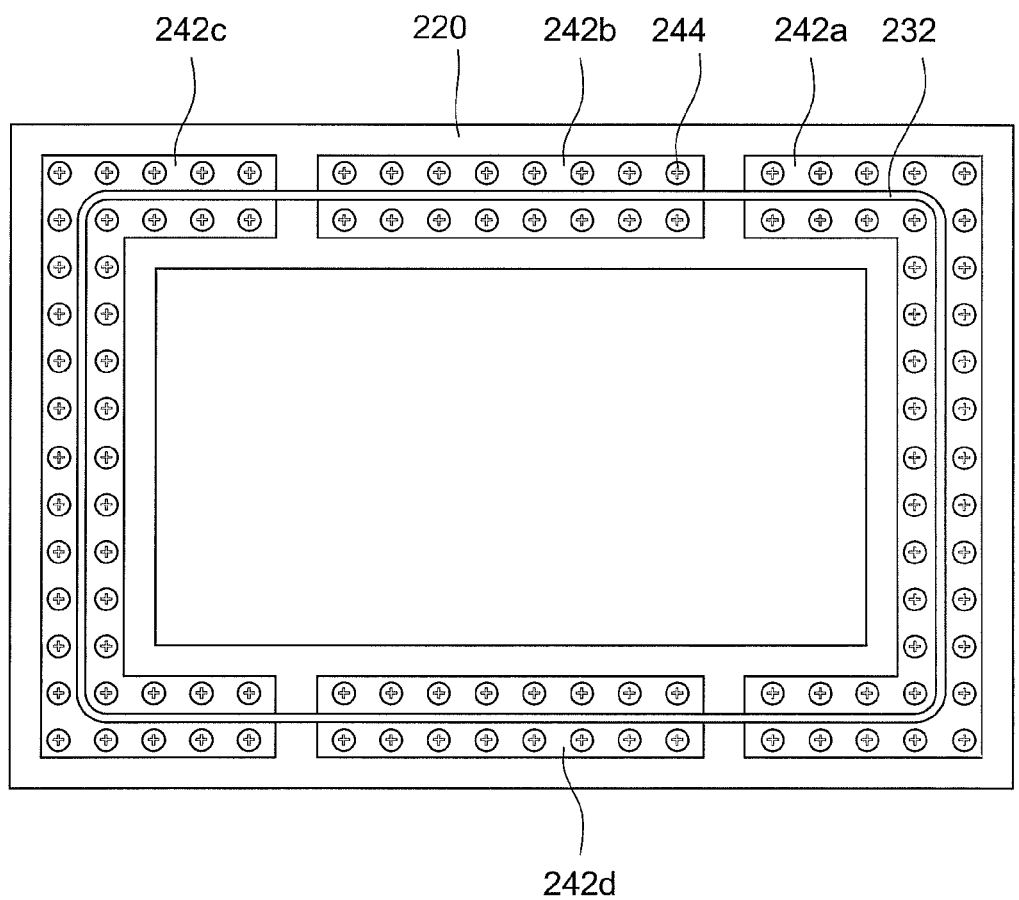
FIG. 16 is a plan view of the apparatus shown in FIG. 15.

Alternatively, the upper plate 242 and the lower plates 342 can be formed from a plurality of segments. As shown in FIG. 15, the upper segments 242a, 242b, 242c and 242d and the lower plate segments 342a, 342b, 342c 342d can be connected to each other to form the gap control apparatus. In this instance, the gap control unit 330 can be installed in the second chamber 220 as shown in FIG. 16. Separate seal members for sealing are placed among the plurality of segments 242a, 242b, 242c and 242d and 342a, 342b, 342c and 342d.

As described above, the gap control members make it possible to accomplish a horizontal movements of a chamber while a vacuum state is maintained, thereby shortening a process time. In addition, because it is possible to compensate for uneven compression of a main seal member by selectively compressing a second seal member, a more uniform gap can be obtained between the substrates.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of illustrative embodiments have been described, it should be understood that numerous other modifications and embodiments can be devised by those skilled in the art that will fall within the spirit and scope of the principles of this disclosure. More particularly, various variations and modifications are possible in the component parts and/or arrangements of the subject combinations which would fall within the scope of the disclosure, the drawings and the appended claims. In addition to variations and modifications in the component parts and/or arrangements, alternative uses will also be apparent to those skilled in the art.

What is claimed is:

1. A method of attaching substrates comprising:
providing an apparatus including first and second chambers mounted on a main frame to form a sealed attaching space therebetween, and an alignment control device including a body having a first side thereof facing the first chamber and a second side thereof facing the second chamber, and a fixation device that movably couples the body to the second chamber such that the body is slideable relative to the second chamber while the fixation device remains fixed relative to the second chamber, a main seal provided between the first side of the body and the first chamber, and an auxiliary seal provided between the second side of the body and the second chamber;

determining an amount of compression of the main seal at a plurality of locations around a periphery of the first chamber and the second chamber after the first chamber and the second chamber have been brought together to form a sealed attaching space; and adjusting a compression amount of the auxiliary seal to adjust a gap between the first chamber and the second chamber.

2. The method of claim 1, wherein adjusting a compression amount of the auxiliary seal comprises adjusting the compression amount such that a combined height of the main seal and the auxiliary seal is substantially uniform around the periphery of the first chamber and the second chamber.

3. The method of claim 2, wherein the auxiliary seal is positioned between the second chamber and the body, and wherein adjusting a compression amount of the auxiliary seal comprises adjusting a distance between the body and the second chamber so as to vary the compression amount.

4. The method of claim 3, wherein adjusting a distance between the body and the second chamber comprises turning at least one of a plurality of bolts of the fixation device so as to adjust the distance between the body and the second chamber.

\* \* \* \* \*